Oct. 6, 1970   JAMES E. WEBB   3,532,551
ADMINISTRATOR OF THE NATIONAL
AERONAUTICS AND SPACE ADMINISTRATION
SOLAR CELL INCLUDING SECOND SURFACE MIRROR
Filed Jan. 30, 1968

INVENTOR.
RALPH R. SCOTT
BY
ATTORNEYS.

United States Patent Office 3,532,551
Patented Oct. 6, 1970

3,532,551
SOLAR CELL INCLUDING SECOND
SURFACE MIRRORS
James E. Webb, Administrator of the National Aeronautics and Space Administration, with respect to an invention of Ralph R. Scott, Levittown, Pa.
Filed Jan. 30, 1968, Ser. No. 701,654
Int. Cl. H01e 15/02
U.S. Cl. 136—89                                  9 Claims

ABSTRACT OF THE DISCLOSURE

A fused silica cover plate is bonded over a solar cell with portions of the plate overhanging the edges of the cell and a reflective coating is formed on the second or lower surface of the overhanging portions to reduce the amount of heat absorbed by the cell and hence reduce the overall temperature.

ORIGIN OF THE INVENTION

The invention described herein was made in the performance of work under a NASA contract and is subject to the provisions of Section 305 of the National Aeronautics and Space Act of 1958, Public Law 85–568 (72 Stat. 435; 42 USC 2457).

BACKGROUND OF THE INVENTION

This application relates to solar cell arrays for converting solar radiant energy to electrical energy, and more particularly to a method for modifying an existing array to reduce the overall temperature of the array without any major redesign of the structure.

Energy converting solar cell arrays used to provide electrical power for a spacecraft are naturally designed to fit the power requiremens of he paricular spacecraf. The efficency of the silicon cells usually used for such arrays decreases as temperature increases and hence there are mximum operating temperature limits. Since some spacecrafts travel much closer to the sun than others, it becomes necessary to design a solar cell array so that its maximum operating temperature fits the flight path of the particular spacecraf. However, it is desirable ha modifications be made to existing arrays without changing the basic size or shape of the array, even though this may in general involve accepting a reduced power output. Also, the design change should be one that permits relatively easy adjustment to fit the prescribed requirements.

SUMMARY OF THE INVENTION

Briefly stated, a solar cell having a cover plate made of light transmitting material and including portions overhanging the edges of the cell is formed with a reflective coating on the underside of the overhanging portions. Thus, the effective absorptivity to emissivity ratio for the surface surrounding the cell is kept as low as possible. Averaging this ratio with the higher ratio for the active solar cell surface results in a reduced effective value for the overall surface and hence a reduced overall temperature. Advantageously, the amount of the temperature reduction may be controlled by suitably choosing the size of the overhanging area with respect to the active solar cell surface. In a preferred arrangement, the reflective surface may be conveniently produced by evaporating a metallic coating directly onto the undersides of the overhanging portions of the fused silica cover plate.

DETAILED DESCRIPTION OF THE SPECIFICATION AND DRAWINGS

For a more thorough understanding of the invention refer now to the following detailed description and drawings in which.

Figure 1:
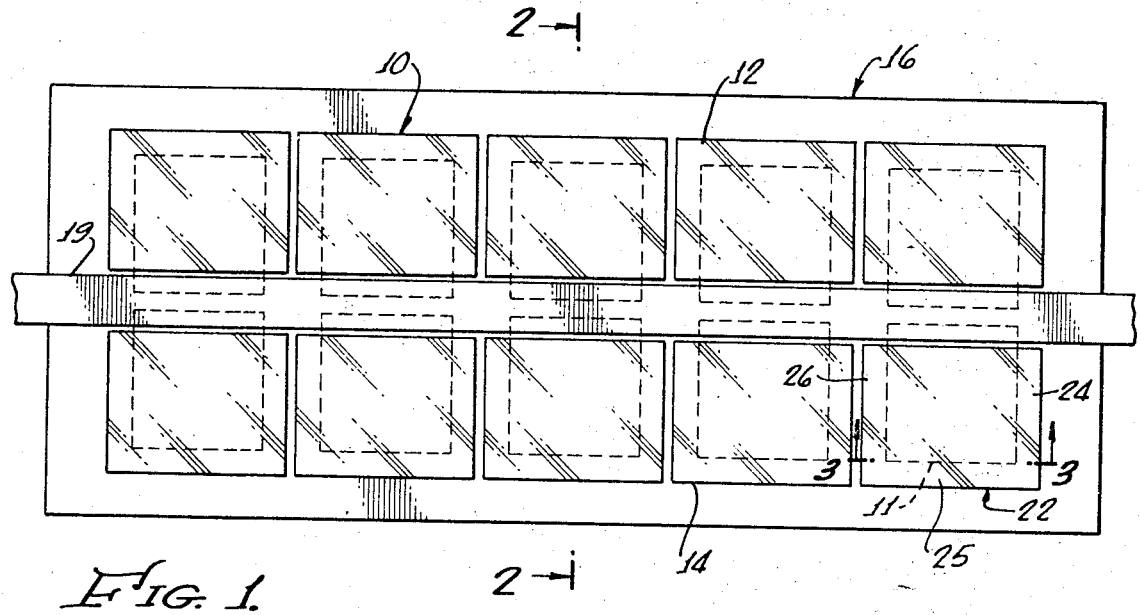
FIG. 1 is a plan, partially schematic view of a solar cell module shown on a supporting envelope.

Referring now to the drawings, there is shown a solar cell module with a plurality of rectangular solar cell assemblies 10, including photovoltaic cells 11, and arranged in two spaced parallel rows 12 and 14. The assemblies 10 are bonded by a suitable layer 15 of adhesive to a substrate or envelope 16. The substrate serves as a strong but lightweight support for the cell assemblies 10 and is typically an aluminum honeycomb structure 17 insulated from the cell 11 by a layer 18 of resin impregnated glass fiber cloth. An elongated electrical conductor 19 extends parallel to the cell rows 12 and 14 in contact with the upper surface of each cell along its inner edge 11a which forms one terminal for each cell. A similar elongated electrical conductor 20 is attached to the other terminal formed on the inner edge 11b of the lower surface of each cell.

The remainder of the upper surface of each cell has bonded thereto, by a suitable transparent layer of cement 21, a thin fused silica cover plate 22 which includes portions 24, 25, and 26 that overhang the edges of the cell 11. The edges of the plate 22 are slightly spaced from adjacent plates.

The center portion 22a of the silica cover plate 22 which extends over the active surface of cell 11 is coated with a thin blue multilayer interference filter 28 on the surface next to the cell. The outer surface of the silica cover plate 22 is formed with a thin antireflection coating 30 to enhance the absorptivity of the cover plate 22 and hence the cell 11.

The overhanging portions 24, 25, and 26 of the silica cover plates have formed on their second or lower surface a thin reflective metallic coating 32 effectively making these portions second surface mirrors. This coating 32 is preferably silver or aluminum and may be vacuum deposited. If desired the lower surface of the reflective coating 32 may be protected by a suitable layer, not shown, of material such as Inconel, a trade name for a composition of approximately, 80% nickel, 5% iron, and 15% chromium.

The solar cells 11 are semiconductors wafers preferably made of silicon but including a dissimilar semiconductor material so that a p-n junction is created. The function of a photovoltaic cell is of course to convert light energy, falling on its surface to useful electric energy. Most solar cells utilize silicon semiconductors in that they have good response to sunlight. The spectral response of silicon begins in the short infrared region, extends through the visible region, and stops short of the ultraviolet region. The radiant energy from the sun which is outside of the spectral response range of a silicon solar cell merely increases the temperature of a cell which it strikes. Also, since the efficiency of a silicon photovoltaic cell is relatively low, a considerable portion of the absorbed radiation is converted to heat rather than electricity.

The power output of the silicon photovoltaic cell decreases as temperature increases, at a rate of approximately 0.6% per degree centigrade as the temperature is raised above 10° centigrade. At colder temperatures this coefficient becomes progressively smaller and may exhibit small positive values. Hence, as the distance from the sun of a particular solar cell array increases, the efficiency will increase because of the lower temperature; however, the available energy per unit area naturally decreases as the distance from the sun increases. As a result, it is of course necessary to consider the varying distances from the sun that a spacecraft will be, in determining the design of its solar cell array along with the power requirements of the craft. As mentioned above, it is desirable that a convenient arrangement be provided for modifying an array to fit a given need without changing the basic size or shape of the array. If a spacecraft is to travel closer to the sun than that for which a particular array was originally designed it is necessary to accommodate the resulting temperature increase which would occur.

The fused silica cover plates 22 are transparent to the radiant energy which produces the photovoltaic action in silicon solar cells and hence the plates do not inhibit the absorptivity of this energy. On the other hand, the plates cause an increase in the infrared emissivity of the cell assemblies, and a high value of infrared emissivity allows the cell assemblies to reject more heat to cold space and thus operate at a lower temperature. The coating 21 of the cement is also transparent to essentially the same type of energy as the plate. The blue optical filter layer 28 selectively reflects the ultraviolet portion of the solar energy which would only contribute heat to the cell assemblies 10. The filter 28 further serves to shield the transparent bonding cement 21 from harmful ultraviolet radiation which might degrade the quality of the bond.

Figure 2:
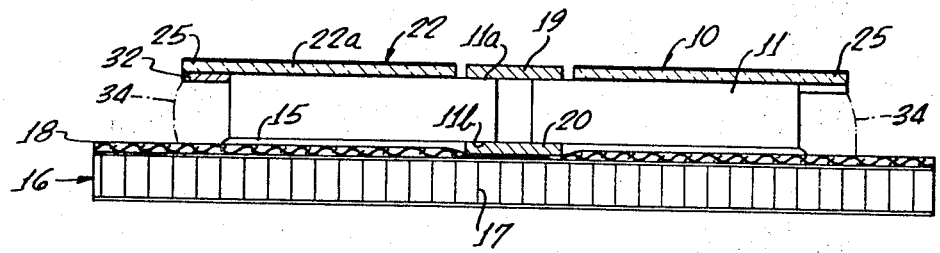
FIG. 2 is an enlarged cross-sectional view of the module of FIG. 1 taken along line 2—2.
Figure 3:
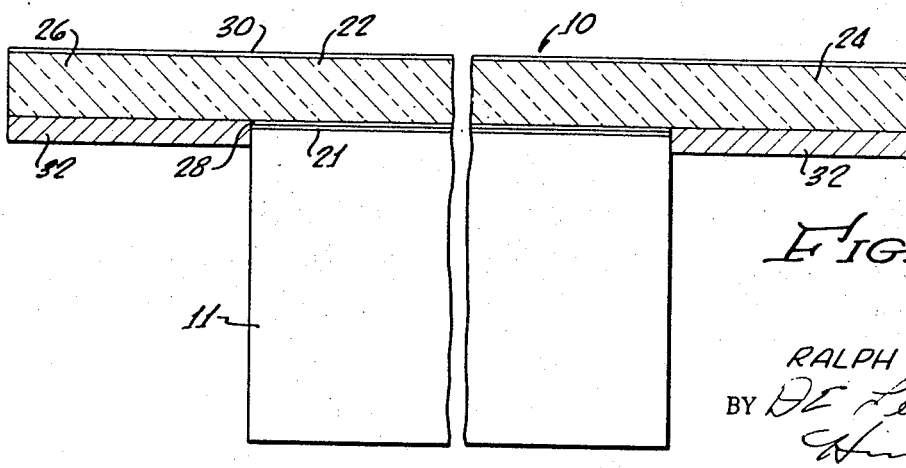
FIG. 3 is a greatly enlarged cross-sectional view of a single cell assembly on line 3—3 of FIG. 1.

In sptie of the beneficial aspects of the cover plates 22 and the filter 28, additional measures are necessary to reduce temperature if the solar array is to travel close to the sun. The addition of the plate overhanging portions 24, 25, and 26 of the cover plates 22 and the reflective coating 32 on their second or lower surfaces solves this problem by substantially decreasing the temperature of the overall array. In one example of the invention, the absorptivity value of the cell assembly within the active cell area 22a was .74 (with 1.0 being a perfect absorber) while the absorptivity value of the overhang portions 24, 25, and 26 of the cell assembly was .05 to .08. Consequently, by averaging the low absorptivity value of the overhang area with that of the active cell area, the overall absorptivity average value is decreased. The magnitude of the overall absorptivity decrease is controlled by the ratio of overhang area to active cell area. Since the overhang portions are in close proximity to the main portion of the cell and the assemblies are small, an efficient absorptivity averaging results, and the temperature gradient across the cell assembly is quite small even though the silica cover plate is not a very good conductor of heat. In this regard, if desired a potting compound 34, indicated by the broken lines in FIG. 2, may be positioned between the overhang portions 24–26 and the substrate 16 and in contact with the edges of the cells 11 to conduct heat and further reduce any temperature gradients.

In the above example, the emissivity value of the plate overhang portions 24, 25, and 26 with the reflective coating 32 remained about the same as the emissivity value for the active solar cell surface, which was approximately .82. However, due to the increased area with the overhang, a greater quantity of heat producing radiation is emitted from the combined assembly 10 than without the overhang portions. Thus the addition of the plate overhanging portions results in a reduction of the solar absorptivity as well as an increase in the effective infrared emissivity of the cell assembly. The net result is that with the reflective overhang portions the ratio of the absorptivity to emissivity values for the cell assemblies 10 is decreased and the overall temperature of the array is decreased with a minimum reduction of the array power output due to lost area for energy conversion.

While only a single embodiment of the invention has been illustrated, it will be understood that other variations may now be apparent to one skilled in the art. Accordingly, it is intended that all such variations that fall within the true spirit and scope of the invention be included in the appended claims.

What is claimed is:

1. A solar cell assembly comprising:
   a solar cell;
   a cover plate made of material that is a transmitter of solar energy to which the cell is responsive for photovoltaic action, the plate including portions overhanging the cell; and
   means on the underside of said cover plate overhanging portions which reflects a greater quantity of solar energy than is transmitted therethrough to thereby decrease the overall temperature of the assembly with a minimum reduction of the assembly power output due to lost area for energy conversion.

2. A solar cell assembly as defined in claim 1 wherein said reflective means comprises a metallic coating on the underside of said cover plate.

3. A solar cell assembly as defined in claim 2 wherein said metallic coating is silver.

4. A solar cell assembly as defined in claim 2 wherein said metallic coating is aluminum.

5. A solar cell assembly as defined in claim 1 wherein the portions of said cover plate directly over the solar cell has an interference filter thereon above said cell.

6. A solar cell assembly as defined in claim 1:
   including an electrical conductor in contact with one edge of the cell; and
   wherein said cover plate overhangs the other edges of the cell.

7. A solar cell assembly as defined in claim 1 wherein said cover plate is made of fused silica; and
   including an antireflective coating formed on the outer surface of said cover plate.

8. A photovoltaic cell array comprising:
   a plurality of photovoltaic cells electrically connected to each other;
   a cover plate over the light responsive top surface of each of said cells, each plate including a portion overhanging its respective cell, the cover plates being of material that is an effective transmitter of radiant energy within the responsive range that produces photovoltaic action in the cells and is an effective emitter of radiant heat which is outside the responsive range; and
   means on the underside of said cover plate overhanging portions which reflects a greater quantity of radiant energy than is transmitted therethrough to decrease the overall temperature of the array with a minimum reduction of the array power output due to the lost area for energy conversion.

9. A cell array as defined in claim 8 wherein:
   said cells are primarily made of silicon, have a generally rectangular shape, and are arranged in two closely spaced parallel rows with said conductor extending parallel to said rows and overlapping an edge of each cell; and
   said cover plates are made of fused silicon and overhang the other three edges of its respective cell, with the adjacent edges of the cover plates being slightly spaced from each other.

References Cited

UNITED STATES PATENTS

| | | | |
|---|---|---|---|
| 2,688,564 | 9/1954 | Forgue. | |
| 2,873,303 | 2/1959 | Rittner | 136—89 |
| 3,009,006 | 11/1961 | Kostelec | 136—89 |
| 3,038,952 | 6/1962 | Ralph | 136—89 |
| 3,049,622 | 8/1962 | Ahlstrom et al. | 136—89 |
| 3,350,234 | 10/1967 | Ule | 136—89 |
| 3,370,986 | 2/1968 | Amsterdam et al. | 136—89 |
| 3,375,141 | 3/1968 | Julius | 136—89 |
| 3,419,433 | 12/1968 | Seifer | 136—89 |
| 3,076,861 | 2/1963 | Samulon et al. | 136—89 |
| 2,567,331 | 9/1951 | Gaiser et al. | |

OTHER REFERENCES

O. S. Heavens, "Practical Applications of Thin Films in Optics," in Butterworth Scientific Pub., 1955, pp. 207, 215, 216.

F. C. Campbell, "Effects of Radiation on Transmittance of Glasses and Adhesives," in Proc. 17th Annual Power Sources Conf., October 1963, pp. 19–22.

ALLEN B. CURTIS, Primary Examiner